Nov. 6, 1962    M. LUDEWIG ETAL    3,062,100

FOCUSSING TELESCOPE OBJECTIVE

Filed April 23, 1957

INVENTORS
Maximilian Ludewig
Felix Stumpf
BY Benj. T. Rauber
their attorney

# United States Patent Office 3,062,100
Patented Nov. 6, 1962

3,062,100
FOCUSSING TELESCOPE OBJECTIVE
Maximilian Ludewig and Felix Stumpf, Wetzlar (Lahn), Germany, assignors to Ernst Leitz, G.m.b.H., Wetzlar (Lahn), Germany, a corporation of Germany
Filed Apr. 23, 1957, Ser. No. 654,480
Claims priority, application Germany Aug. 24, 1953
1 Claim. (Cl. 88—57)

Our invention relates to improvements in telescopes of either the single ocular or binocular type.

This application is a continuation-in-part of our co-pending application Ser. No. 451,124, filed August 20, 1954, now abandoned.

Heretofore the focussing of telescopes has been accomplished by varying the effective distance of the ocular from the objective. In our present invention we provide a focussing means in which focussing may be accomplished by varying the focal length of the objective lens system. Our focussing means may be used in place of the focussing systems heretofore used or in conjunction with them.

In our invention we provide an objective in which two components forming the objective may be separated, the separation being limited to a distance in which the two components act as an objective. One of the components of the objective may be a cemented pair of lenses and the other component may be a simple lens. Both components of the objective are positive lenses of nearly equal refracting power. Either of these components may be fixed and the other movable.

The refractive power, $\varphi$, of the objective, which is the reciprocal of its focal length $f$, ($\varphi = 1/f$), is given in the following equation:

$$\varphi = \varphi_1 + \varphi_2 - e\varphi_1\varphi_2$$

where $\varphi_1$ and $\varphi_2$ are the respective refractive powers of the two components and $e$ is the distance the components are spaced.

It is evident from the above equation that the refractive power $\varphi$ decreases with the distance $e$. This spacing will in general be small as compared with the total thickness of the objective.

The separability of the two components of the objective provides a focussing means having inherent advantages and also is particularly suited for providing a sealed telescope tube that is free from the entrance of dust or moisture. Thus, one component may be sealed airtight to the tube and fixed in position and the other component be movable in the tube. Especially there may be provided means of a magnetic coupling to a control element outside of the tube. The control element may be screw threaded to the exterior of the tube to give a fine adjustment of the movable component which may be mounted in a rim of magnetic material suitably guided in the tube.

Figure 1:
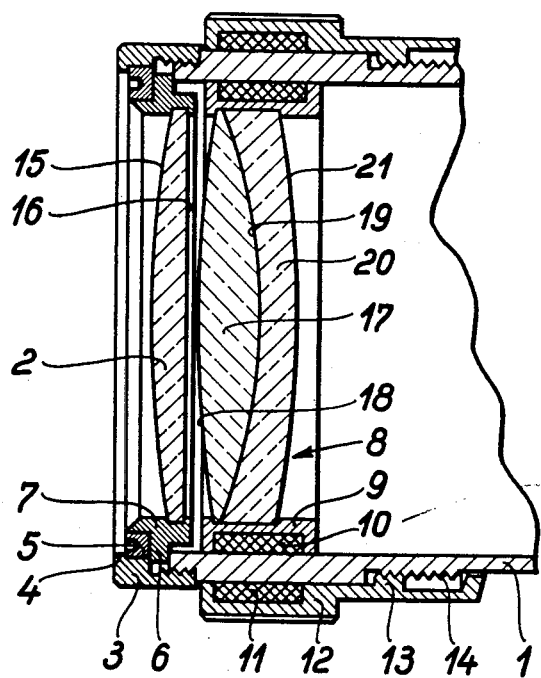
Figure 2:
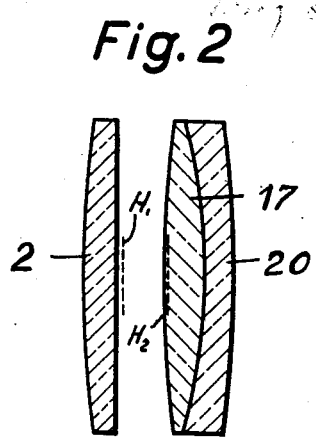
Figure 3:
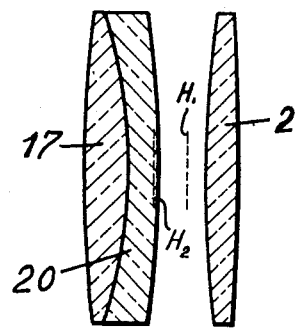

The invention is illustrated by way of example in the accompanying drawings in which FIG. 1 is a longitudinal section of an objective end and the objective of a telescope tube embodying our invention, and FIGS. 2 and 3 are sections of objectives embodying our invention.

In the embodiment shown in FIG. 1, a tube 1 is provided at its objective end with a mounting for one component 2 of an objective. The mounting may be of any suitable construction but, in the embodiment shown, comprises an outer ring 3 screw threaded or otherwise secured to the end of the tube and having an inwardly extending flange 4 to secure an eccentric ring 5 which, in turn, overlaps a flange 6 of a ring 7 that encircles the periphery of the lens 2 and holds it securely in position. The eccentric ring 5 is used when it is desired to adjust the principal axis of a companion tube of a binocular.

The edge of the component 2 is sealed airtightly in an integral recess of the ring 7. The mounting comprising the rings 3, 5 and 7 is fluidtight and secured fluidtightly to the end of the tube 1 so that no dust or moisture can enter the tube.

The second component 8 of the objective is mounted in a ring 9 slidable longitudinally of, and guided in, the tube. The ring 9 may be of magnetic material such as steel and magnetized or, as shown in the drawing, may be of non-magnetic material and be provided with a magnetic, magnetized, ring 10 inset into the periphery of the ring 9. The tube 1 is of non-magnetic material, such as brass. A focussing element is provided on the exterior of the tube and comprises a ring 11 of magnetic material of substantially the same width as the ring 10 so that the rings 9 and 10 are coupled by magnetic force to move as a unit. The ring 11 is held in an enclosing ring 12 which is extended to one side as at 13 and in a part of said extension is internally threaded to engage screw threads 14 on the exterior of the tube 1. The extension 13 extends beyond the screw threads 14 to a close, sliding fit on the tube to protect the screw threads against injury and against dust and dirt. By turning the ring 12, it, together with the rings 11, 10 and 9 and the component 8, are moved longitudinally of the tube in a manner to provide a close adjustment of the lens 8 and a resulting fine focussing of the objective.

In the embodiment illustrated, the component 2 is a convex lens having one convex outer surface 15, of radius $R_1$ and an inner convex surface 16 of radius $R_2$. The other component comprises a lens 17 having a convex surface 18 of radius $R_3$ opposite the inner surface of the lens 2 and an inner convex surface 19 of radius $R_4$. Cemented to the lens 17 is a lens 20 having a complementary common surface 19 with the lens 17 and an inner surface 21 of radius $R_5$.

The components may be mounted in the relative positions shown in FIGS. 1 and 2 with one component formed of a single lens 2 secured to the tube 1 and a second component formed of cemented lenses 17 and 20 within, and movable axially in the tube. Or the components may be mounted in the reverse relation as shown in FIG. 3. The principal planes which are also the nodal planes of the objective components are indicated at $H_1$ and $H_2$ respectively. The distance apart of these planes varies with the spacing of the components of the objective Either of the components 2 or 8 may be fixed and the other movable.

By way of illustration, the following lens specifications may be used for FIG. 3.

$f = 100$
$R_5 = -420.4$
$R_4 = +134.1$
$R_3 = -117.8$
$R_2 = -44.2$
$R_1 = +205.1$
Thickness of lens 2, $d_2 = 2$.
Thickness of lens 17, $d_{17} = 2.8$.
Thickness of lens 20, $d_{20} = 3.9$.

The index of refraction of the glass in the respective lenses is: $n_{d_2} = 1.5633$, $n_{d_{17}} = 1.64769$, and $n_{d_{20}} = 1.57633$ and their partial dispersions are, respectively $\nu_2 = 64$, $\nu_{17} = 33.9$ and $\nu_{20} = 64$. The distance, $l$, between the components is $0 < l < 2.3$, that is, the distance may be from zero or contact to a spacing of 2.3. It may be noted that the maximum distance is small relative to the total thickness of the objective so that the components form a unitary objective.

Another examples is as follows, the surfaces of the plano convex lens being $R_1$ and $R_2$ and of the cemented lens being $R_3$, $R_4$ and $R_5$, the thickness of the plano"

convex lens being $d_1$ and of the cemented lenses $d_2$ and $d_3$, the refractive indices and dispersions being indicated in appropriate relation:

[$f=100$]

| | | | |
|---|---|---|---|
| $R_1=+101$ | $d_1=3.5$ | $n_d=1.51633$ | $v=64$ |
| $R_2=\pm 00$ | $0<l<2.3$ | | |
| $R_3=+152.1$ | $d_2=3.9$ | $n_d=1.51633$ | $v=64$ |
| $R_4=-51.5$ | $d_3=2.7$ | $n_d=1.68893$ | $v=31.1$ |
| $R_5=-136.0$ | | | |

It will be understood that these examples are for purposes of illustration and not as limitations. Also the front element may be movable and the inner element fixed.

Having described our invention, what we claim is:

A telescope comprising a tube and an objective consisting of a positive component fixed airtightly in said tube and a positive component movable on the optical axis of the tube within the part of the tube closed by said fixed component, one of said components consisting of a doublet of a positive lens and a negative lens and the other component consisting of a positive lens, said components forming a complete, unitary objective of variable refractive power having the following objective characteristics:

[$f=100$]

| | | | |
|---|---|---|---|
| $R_1=+101.4$ | $d_1=3.5$ | $n_d=1.51633$ | $v=64$ |
| $R_2=\pm 00$ | $0<l<2.3$ | | |
| $R_3=+152.1$ | $d_2=3.9$ | $n_d=1.51633$ | $v=64$ |
| $R_4=-51.5$ | $d_3=2.7$ | $n_d=1.68893$ | $v=31.1$ |
| $R_5=-136.0$ | | | |

References Cited in the file of this patent

UNITED STATES PATENTS

| | | |
|---|---|---|
| 1,358,721 | Fujii | Nov. 16, 1920 |
| 1,561,858 | Jacob | Nov. 17, 1925 |
| 1,616,751 | Konig | Feb. 8, 1927 |
| 2,158,507 | Konig | May 16, 1939 |

FOREIGN PATENTS

| | | |
|---|---|---|
| 574,286 | France | Mar. 27, 1924 |
| L 16,441 | Germany | Feb. 2, 1956 |
| 430,826 | Great Britain | June 24, 1935 |
| 579,993 | Great Britain | Aug. 22, 1946 |